United States Patent [19]

Gagnepain et al.

[11] 4,398,115

[45] Aug. 9, 1983

[54] TEMPERATURE PROBE USING A PLATE OF QUARTZ

[75] Inventors: Jean-Jacques Gagnepain, Recologne; Daniel Hauden, Besancon; Roger Coquerel, Recologne; Claude Pegeot, Sartrouville, all of France

[73] Assignees: Quartz et Electronique; Centre National de la Recherche Scientifique (CNRS), both of Paris, France

[21] Appl. No.: 265,928

[22] Filed: May 21, 1981

[30] Foreign Application Priority Data

May 23, 1980 [FR] France .................................. 80 11509

[51] Int. Cl.³ ........................ H01L 41/08; H03H 9/25
[52] U.S. Cl. .................................. 310/313 A; 374/117
[58] Field of Search ....................... 73/339 A, DIG. 4; 310/313 A; 374/117, 118

[56] References Cited

U.S. PATENT DOCUMENTS

| 3,879,992 | 4/1975 | Bartera ........................ 73/339 A X |
| 3,987,377 | 10/1976 | Kuroda et al. ................ 310/313 A |
| 4,006,435 | 2/1977 | Kerbel ........................ 310/313 A X |
| 4,249,418 | 2/1981 | Ebata .............................. 73/339 A |
| 4,345,176 | 8/1982 | Grudkowski et al. ......... 310/313 A |

FOREIGN PATENT DOCUMENTS 2916078 10/1979 Fed. Rep. of Germany ... 73/339 A

OTHER PUBLICATIONS

Publ., "Handbook of Piezoelectric Crystals for R. E. Designers", by J. P. Buchanan, (pp. 18-22), 12/1954, TK 656507 P5.

Publ. "Quartz Frequency Thermometer", by A. G. Smagin et al., May, Jun. 1970, Instr. & Exp. Tech. (USA-No. 3), pp. 932-934.

*Primary Examiner*—Daniel M. Yasich
*Attorney, Agent, or Firm*—Sughrue, Mion, Zinn, Macpeak & Seas

[57] ABSTRACT

A quartz crystal plate (L) is used in determining the frequency of a frequency generator, and the frequency determined by said plate is variable as a function of temperature. The quartz plate constitutes the substrate for a surface acoustic wave device, e.g. a resonator or a delay line using comb transducers (1 & 2). The orientation in the quartz crystal of the plane over which the acoustic wave propagates, and the direction of propagation in said plane are defined in terms of a doubly rotated frame of reference as follows: the plate being a double rotation cutting plate defined by yxwl: $\phi/\theta$, one large surface of which is used for the propagation of a surface wave whose direction of propagation makes an angle $\psi$ with the second axis of rotation, where the first angle $\phi$ lies in the range 9°24' to 13°24', the second angle $\theta$ lies in the range 57°24' to 61°24', and the angle $\psi$ lies in the range 33° to 37°.

2 Claims, 11 Drawing Figures

TEMPERATURE PROBE USING A PLATE OF QUARTZ

The present invention relates to a temperature probe using a plate of quartz in a frequency generator.

BACKGROUND OF THE INVENTION

In order to measure and control temperature accurately, thermometer sensors are used that have a high degree of sensitivity and linearity in the required temperature range. The ultimate resolution of the measuring instrument is determined by the measuring chain and the physical characteristics of the sensor.

A wide variety of physical phenomena have been used to provide temperature probes capable of operating over various temperature ranges. For example, probes based on the principle of expansion in bodies that are solid, liquid (alcohol, mercury) or gaseous (hydrogen) have been used, as have probes based on visible radiation (pyrometers). Other instruments rely on temperature variations in electrical characteristics in resistors, thermistors, and thermocouples.

At present, the highest performance temperature measuring instruments rely on methods that cause the frequency of an oscillator to vary with temperature. In particular, it has been known for some years that plates of quartz used as frequency standards in high stability oscillators are subject to temperature effects that perturb their accuracy.

Since quartz is anisotropic, crystal cut orientations can be found to minimize, or alternatively to selectively increase sensitivity to temperature.

A quartz orientation that can be used to produce plates with a linear temperature coefficient over a wide temperature range is described by D. L. Hammond, C. A. Adams & P. Schmidt in a paper entitled "A linear quartz crystal temperature sensing element" given at the 19th annual conference of the ISA in October 1964. This bulk wave quartz cut, known as the LC (Linear Coefficient) cut, has been used to make a quartz thermometer by inserting the plate in an amplified loop to obtain an oscillator whose frequency varies linearly with temperature (D. L. Hammond &. A. Benjaminson in "Unthermomètre linéaire à quartz" (A linear quartz thermometer), in the February 1966 issue of the journal "Mesure"). Measurements could be performed automatically with a resolution of $10^{-4}°$ C. over a temperature range of $-40°$ C. to $+230°$ C. A major drawback of such a probe is that its response time is about 10 seconds, which is due to the fact that the bulk wave quartz plate is held by three fixing points which are the seat of the main heat exchangers. The sensitivity of this probe is about $35 \times 10^{-6}/°$ C., which corresponds to a frequency variation of $10^3$ Hz/° C. at an operating frequency of 28 MHz (3rd partial).

Preferred embodiments of the present invention reduce the response time of such a temperature probe and increase the accuracy of temperature measurement.

SUMMARY OF THE INVENTION

The present invention provides a temperature probe comprising a quartz crystal plate for use in determining the frequency of a frequency generator, the frequency determined by said plate being variable as a function of temperature, wherein the quartz plate constitutes the substrate for a surface acoustic wave device, and wherein the orientation in the quartz crystal of the plane over which the acoustic wave propagates, and the direction of propagation in said plane, said defined in terms of a doubly rotated frame of reference as follows:

a base frame of reference OXYZ in the quartz crystal is defined by the optical axis OZ, one of the electrical axes OX, and a mechanical axis OY at right angles to the axis OX;

said base frame of reference OXYZ is rotated through a first angle $\phi$ about the optical axis OZ thereby obtaining a singly rotated frame of reference OX'Y'Z';

said singly rotated frame of reference OX'Y'Z' is rotated through a second angle $\theta$ about the axis OX' (that is itself rotated $\phi$ away from said electrical axis OX) thereby obtaining a doubly rotated frame of reference OX"Y"Z";

the plate is cut such that surface waves propagate in the OX"Z" plane defined in said doubly rotated frame of reference; and said surface wave are caused to propagate in a direction that is at a third angle $\psi$ to the axis OX" in said OX"Z" plane; as such, the plate is a double rotation cutting plate defined by yxwl: $\phi/\theta$ in which one large surface is used for the propagation of a surface wave whose direction of propagation makes the angle $\psi$ with the second axis of rotation;

where the said first angle $\phi$ lies in the range 9°24" to 13°24', said second angle $\theta$ lies in the range 57°24' to 61°24', and said third angle $\psi$ lies in the range 33° to 37°.

BRIEF DESCRIPTION OF THE DRAWINGS

Embodiments of the invention are described by way of example with reference to the accompanying drawings, in which.

DESCRIPTION OF PREFERRED EMBODIMENTS

Temperature probes in accordance with the present invention are based on the properties of quartz crystal. These properties are particularly applicable to implementing resonators or delay lines in oscillators. The main properties in question are a high degree of purity, high chemical stability and great elasticity.

Because of the anisotropic structure of quartz, the frequency-temperature characteristic of a quartz device can be varied by a suitable choice of angular orientations of cut. Thus an ST cut gives rise to a parabolic temperature characteristic, with inversion taking place at a temperature of about +20° C. Plates obtained from such a single rotation cut are used for surface wave devices.

The frequency-temperature characteristic of a quartz crystal is adequately represented over a fairly wide temperature range by a third order polynomial of the form:

$$f(T)=f(T_0)[1+a_1(T-T_0)+a_2(T-T_0)^2+a_3(T-T_0)^3]$$

where $T_0$ is a reference temperature, and $a_1$, $a_2$ & $a_3$ are first, second and third order frequency coefficients.

A study of the coefficients and the variation of frequency as a function of temperature can be found in an article entitled "High order temperature coefficients of quartz SAW oscillators" by D. Hauden, M. Michel & J. J. Gagneplan in the Proceedings of the 32nd Annual Symposium on Frequency Control, May 1978.

A plate of quartz with an ideal frequency response as a function of temperature would have zero second and third order coefficients $a_2$ & $a_3$, in which case the frequency-temperature characteristic would be perfectly linear.

The Applicants have discovered that, by taking advantage of the two degrees of freedom offered by the angles $\phi$ & $\theta$ defining a double rotation cut, they can obtain plates of quartz with lower value second and third order coefficients than is possible with single rotation cuts. Furthermore, the coefficients can be further reduced by choosing a direction of propagation for surface waves different from the OX″ axis which is rotated through an angle o about the optical axis OZ of the crystal away from one of the electrical axes OX. Such plates are obtained from double rotation cuts in which the angles $\phi$ & $\theta$ lie in the following ranges: 9°24′ to 13°24′ for the angle $\phi$; and 57°24′ to 61°24′ for the angle $\theta$. The direction of surface wave propagation on such plates should be at an angle $\psi$ to the OX″ axis, with $\psi$ lying in the range 33° to 37°.

Figure 1:
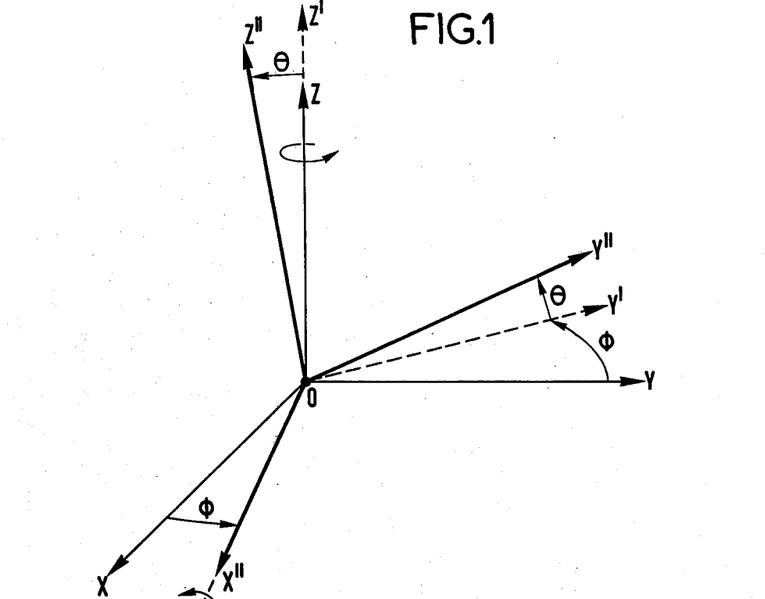
FIG. 1 shows the rotations of the frames of reference relative to the quartz in a double rotation cut.

FIG. 1 shows the rotation of the frame of reference OXYZ in a double rotation cut for a plate initially having its thickness according to the Y axis and its length according to the X axis.

The frame of reference is itself defined by the optical axis OZ of the crystal, by an electrical axis OX and by a mechanical axis OY that is at 90° to the axis OX.

The angle $\phi$ describes a first rotation of the frame of reference about the axis OZ; this gives a frame of reference OX′Y′Z′, with the axes OZ & OZ′ constituting the same axis.

The angle $\theta$ describes a second rotation of the frame of reference OX′Y′Z′ about the axis OX′; this gives a frame of reference OX″Y″Z″, with the axes OX′ & OX″ constituting the same axis. The cut plane, and hence the plane of the plates is the plane OX″Z″, the cut of such a plate being defined by yxwl: $\phi/\theta$.

Figure 2:
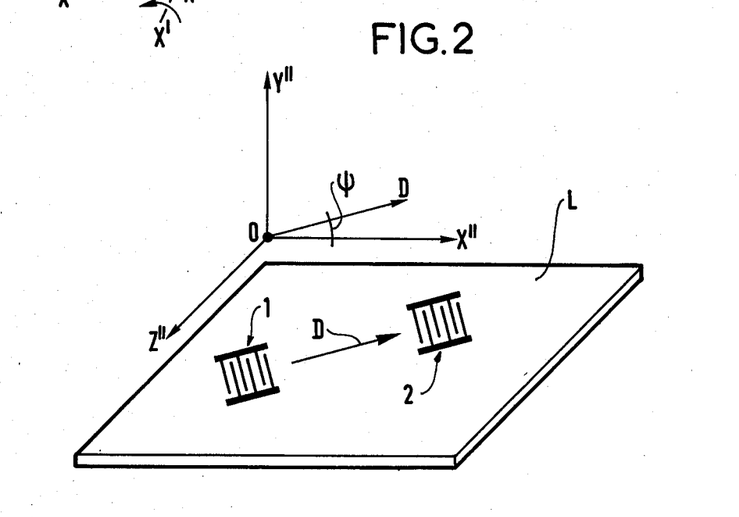
FIG. 2 shows the direction of propagation of a surface wave over a double rotation plate.

FIG. 2 shows the direction of propagation D of surface waves over a double rotation cut plate L, having two transducers 1 & 2, said plate being defined by yxwl: $\phi/\theta$.

The direction of propagation D makes an angle $\psi$ with the axis OX″ in the plane OX″Z″, the OX″ axis being confused with the second rotation axis OX′.

The angles $\phi$, $\theta$ & $\psi$ are in the notation laid down by the 1949 IEEE convention.

To obtain zero second and third order coefficients, to within experimental error, the angles $\phi$, $\theta$ & $\psi$ should have the following values:

$\phi = 11°24′$ $\theta = 59°24′$ $\psi = 35°$

A plate defined by the cut yxwl: 11°24′/59°24′ and on a large surface of which a surface wave is propagated, according to a direction making an angle $\psi = 35°$ with the axis of second rotation, to a temperature coefficient of $30 \times 10^{-6}$/°C. Such a metalized plate is referred to herein as an LTS plate (Linearly temperature sensitive).

LTS plates may be of the delay line type or of the resonator type.

A surface wave delay line is constituted by two transducers, each in the form of two interdigitated combs of metal fingers deposited on one face of the piezoelectric substrate. Since the transducers are bidirectional, surface waves are emitted in opposite directions. Absorbant material eliminates reflections due to the waves emitted towards the edge of the plate.

A resonator comprises one transducer with a reflector on each side of the transducer, which is generally in the form of two interdigitated combs.

For both the resonator and the delay line configurations, the combs are oriented on the quartz plate such as to obtain a direction of surface wave propagation that makes an angle $\psi$ with the axis of second rotation OX′ as shown in FIG. 2.

The plates of quartz are cut and measured using conventional techniques. Reference should be made in this respect to the article "Goniometric Measurements of the Angles of Cut of Doubly Rotated Quartz Plates" by J. Clastre, C. Pegeot & P. Y. Leroy in the Proceedings of the 32nd Annual Symposium on Frequency Control, U.S. Army Electronic Command, Ft Monmouth, New Jersey—May 1978.

The combs and reflectors are then obtained by conventional techniques, and in particular by photoengraving.

A temperature probe in accordance with the invention is essentially used in a frequency generator that incorporates the LTS plate of the temperature probe, with the plate used in an amplifier feedback loop, or in a phase locking loop of voltage controlled local oscillator or of a frequency synthesiser. The temperature response of the probe is obtained by plotting its frequency-temperature characteristic.

Figure 3:
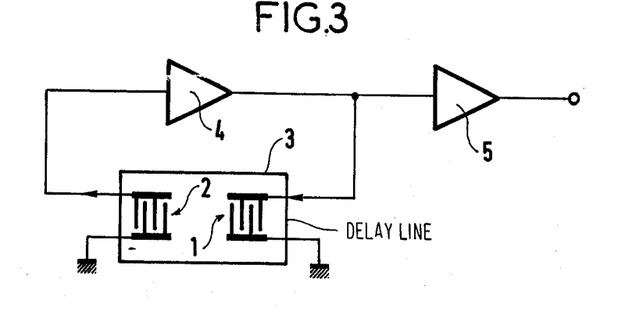
FIG. 3 schematically shows a frequency generator circuit using a first type of temperature probe in accordance with the invention.

FIG. 3 schematically represents a frequency generator circuit using a temperature probe constituted by a delay line 3 accordance with the invention comprising a delay line 3 connected across the terminals of an amplifier 4, together with an output amplifier 5. The transducers 1 & 2 of the delay line 3 are connected respectively to the input and to the output of the amplifier 4. The delay line 3 and the amplifier 4 constitute an oscillator.

To sustain oscillation, it is necessary for the amplifier 4 to have sufficient gain to to compensate loss round the

TEMPERATURE PROBE USING A PLATE OF QUARTZ

The present invention relates to a temperature probe using a plate of quartz in a frequency generator.

BACKGROUND OF THE INVENTION

In order to measure and control temperature accurately, thermometer sensors are used that have a high degree of sensitivity and linearity in the required temperature range. The ultimate resolution of the measuring instrument is determined by the measuring chain and the physical characteristics of the sensor.

A wide variety of physical phenomena have been used to provide temperature probes capable of operating over various temperature ranges. For example, probes based on the principle of expansion in bodies that are solid, liquid (alcohol, mercury) or gaseous (hydrogen) have been used, as have probes based on visible radiation (pyrometers). Other instruments rely on temperature variations in electrical characteristics in resistors, thermistors, and thermocouples.

At present, the highest performance temperature measuring instruments rely on methods that cause the frequency of an oscillator to vary with temperature. In particular, it has been known for some years that plates of quartz used as frequency standards in high stability oscillators are subject to temperature effects that perturb their accuracy.

Since quartz is anisotropic, crystal cut orientations can be found to minimize, or alternatively to selectively increase sensitivity to temperature.

A quartz orientation that can be used to produce plates with a linear temperature coefficient over a wide temperature range is described by D. L. Hammond, C. A. Adams & P. Schmidt in a paper entitled "A linear quartz crystal temperature sensing element" given at the 19th annual conference of the ISA in October 1964. This bulk wave quartz cut, known as the LC (Linear Coefficient) cut, has been used to make a quartz thermometer by inserting the plate in an amplified loop to obtain an oscillator whose frequency varies linearly with temperature (D. L. Hammond &. A. Benjaminson in "Unthermomètre linéaire à quartz" (A linear quartz thermometer), in the February 1966 issue of the journal "Mesure"). Measurements could be performed automatically with a resolution of $10^{-4}$° C. over a temperature range of $-40$° C. to $+230$° C. A major drawback of such a probe is that its response time is about 10 seconds, which is due to the fact that the bulk wave quartz plate is held by three fixing points which are the seat of the main heat exchangers. The sensitivity of this probe is about $35 \times 10^{-6}$/° C., which corresponds to a frequency variation of $10^3$ Hz/° C. at an operating frequency of 28 MHz (3rd partial).

Preferred embodiments of the present invention reduce the response time of such a temperature probe and increase the accuracy of temperature measurement.

SUMMARY OF THE INVENTION

The present invention provides a temperature probe comprising a quartz crystal plate for use in determining the frequency of a frequency generator, the frequency determined by said plate being variable as a function of temperature, wherein the quartz plate constitutes the substrate for a surface acoustic wave device, and wherein the orientation in the quartz crystal of the plane over which the acoustic wave propagates, and the direction of propagation in said plane, said defined in terms of a doubly rotated frame of reference as follows:

a base frame of reference OXYZ in the quartz crystal is defined by the optical axis OZ, one of the electrical axes OX, and a mechanical axis OY at right angles to the axis OX;

said base frame of reference OXYZ is rotated through a first angle $\phi$ about the optical axis OZ thereby obtaining a singly rotated frame of reference OX'Y'Z';

said singly rotated frame of reference OX'Y'Z' is rotated through a second angle $\theta$ about the axis OX' (that is itself rotated $\phi$ away from said electrical axis OX) thereby obtaining a doubly rotated frame of reference OX"Y"Z";

the plate is cut such that surface waves propagate in the OX"Z" plane defined in said doubly rotated frame of reference; and said surface wave are caused to propagate in a direction that is at a third angle $\psi$ to the axis OX" in said OX"Z" plane; as such, the plate is a double rotation cutting plate defined by yxwl: $\phi/\theta$ in which one large surface is used for the propagation of a surface wave whose direction of propagation makes the angle $\psi$ with the second axis of rotation;

where the said first angle $\phi$ lies in the range 9°24" to 13°24', said second angle $\theta$ lies in the range 57°24' to 61°24', and said third angle $\psi$ lies in the range 33° to 37°.

BRIEF DESCRIPTION OF THE DRAWINGS

Embodiments of the invention are described by way of example with reference to the accompanying drawings, in which.

DESCRIPTION OF PREFERRED EMBODIMENTS

Temperature probes in accordance with the present invention are based on the properties of quartz crystal. These properties are particularly applicable to implementing resonators or delay lines in oscillators. The main properties in question are a high degree of purity, high chemical stability and great elasticity.

Because of the anisotropic structure of quartz, the frequency-temperature characteristic of a quartz device can be varied by a suitable choice of angular orientations of cut. Thus an ST cut gives rise to a parabolic temperature characteristic, with inversion taking place at a temperature of about +20° C. Plates obtained from such a single rotation cut are used for surface wave devices.

The frequency-temperature characteristic of a quartz crystal is adequately represented over a fairly wide temperature range by a third order polynomial of the form:

$$f(T)=f(T_0)[1+a_1(T-T_0)+a_2(T-T_0)^2+a_3(T-T_0)^3]$$

where $T_0$ is a reference temperature, and $a_1$, $a_2$ & $a_3$ are first, second and third order frequency coefficients.

A study of the coefficients and the variation of frequency as a function of temperature can be found in an article entitled "High order temperature coefficients of quartz SAW oscillators" by D. Hauden, M. Michel & J. J. Gagneplan in the Proceedings of the 32nd Annual Symposium on Frequency Control, May 1978.

A plate of quartz with an ideal frequency response as a function of temperature would have zero second and third order coefficients $a_2$ & $a_3$, in which case the frequency-temperature characteristic would be perfectly linear.

The Applicants have discovered that, by taking advantage of the two degrees of freedom offered by the angles $\phi$ & $\theta$ defining a double rotation cut, they can obtain plates of quartz with lower value second and third order coefficients than is possible with single rotation cuts. Furthermore, the coefficients can be further reduced by choosing a direction of propagation for surface waves different from the OX" axis which is rotated through an angle o about the optical axis OZ of the crystal away from one of the electrical axes OX. Such plates are obtained from double rotation cuts in which the angles $\phi$ & $\theta$ lie in the following ranges: 9°24' to 13°24' for the angle $\phi$; and 57°24' to 61°24' for the angle $\theta$. The direction of surface wave propagation on such plates should be at an angle $\psi$ to the OX" axis, with $\psi$ lying in the range 33° to 37°.

FIG. 1 shows the rotation of the frame of reference OXYZ in a double rotation cut for a plate initially having its thickness according to the Y axis and its length according to the X axis.

The frame of reference is itself defined by the optical axis OZ of the crystal, by an electrical axis OX and by a mechanical axis OY that is at 90° to the axis OX.

The angle $\phi$ describes a first rotation of the frame of reference about the axis OZ; this gives a frame of reference OX'Y'Z', with the axes OZ & OZ' constituting the same axis.

The angle $\theta$ describes a second rotation of the frame of reference OX'Y'Z' about the axis OX'; this gives a frame of reference OX"Y"Z", with the axes OX' & OX" constituting the same axis. The cut plane, and hence the plane of the plates is the plane OX"Z", the cut of such a plate being defined by yxwl: $\phi/\theta$.

FIG. 2 shows the direction of propagation D of surface waves over a double rotation cut plate L, having two transducers 1 & 2, said plate being defined by yxwl: $\phi/\theta$.

The direction of propagation D makes an angle $\psi$ with the axis OX" in the plane OX"Z", the OX" axis being confused with the second rotation axis OX'.

The angles $\phi$, $\theta$ & $\psi$ are in the notation laid down by the 1949 IEEE convention.

To obtain zero second and third order coefficients, to within experimental error, the angles $\phi$, $\theta$ & $\psi$ should have the following values:

$\phi = 11°24'$ $\theta = 59°24'$ $\psi = 35°$

A plate defined by the cut yxwl: 11°24'/59°24' and on a large surface of which a surface wave is propagated, according to a direction making an angle $\psi = 35°$ with the axis of second rotation, to a temperature coefficient of $30 \times 10^{-6}/°C$. Such a metalized plate is referred to herein as an LTS plate (Linearly temperature sensitive).

LTS plates may be of the delay line type or of the resonator type.

A surface wave delay line is constituted by two transducers, each in the form of two interdigitated combs of metal fingers deposited on one face of the piezoelectric substrate. Since the transducers are bidirectional, surface waves are emitted in opposite directions. Absorbant material eliminates reflections due to the waves emitted towards the edge of the plate.

A resonator comprises one transducer with a reflector on each side of the transducer, which is generally in the form of two interdigitated combs.

For both the resonator and the delay line configurations, the combs are oriented on the quartz plate such as to obtain a direction of surface wave propagation that makes an angle $\psi$ with the axis of second rotation OX' as shown in FIG. 2.

The plates of quartz are cut and measured using conventional techniques. Reference should be made in this respect to the article "Goniometric Measurements of the Angles of Cut of Doubly Rotated Quartz Plates" by J. Clastre, C. Pegeot & P. Y. Leroy in the Proceedings of the 32nd Annual Symposium on Frequency Control, U.S. Army Electronic Command, Ft Monmouth, New Jersey—May 1978.

The combs and reflectors are then obtained by conventional techniques, and in particular by photoengraving.

A temperature probe in accordance with the invention is essentially used in a frequency generator that incorporates the LTS plate of the temperature probe, with the plate used in an amplifier feedback loop, or in a phase locking loop of voltage controlled local oscillator or of a frequency synthesiser. The temperature response of the probe is obtained by plotting its frequency-temperature characteristic.

FIG. 3 schematically represents a frequency generator circuit using a temperature probe constituted by a delay line 3 accordance with the invention comprising a delay line 3 connected across the terminals of an amplifier 4, together with an output amplifier 5. The transducers 1 & 2 of the delay line 3 are connected respectively to the input and to the output of the amplifier 4. The delay line 3 and the amplifier 4 constitute an oscillator.

To sustain oscillation, it is necessary for the amplifier 4 to have sufficient gain to to compensate loss round the loop, and for the total phase shift round the loop to be equal to an integer multiple of 2".

It is thus necessary for $\phi_A + \phi_L = 2k\pi$, where $\phi_A$ is the phase shift of the amplifier 4, the matching circuits and the transducers, $\phi_L$ is the phase shift of the delay line 3, and k is an integer.

The relative stability of the oscillator is a few parts in $10^{-9}$ over one second.

Figure 4:
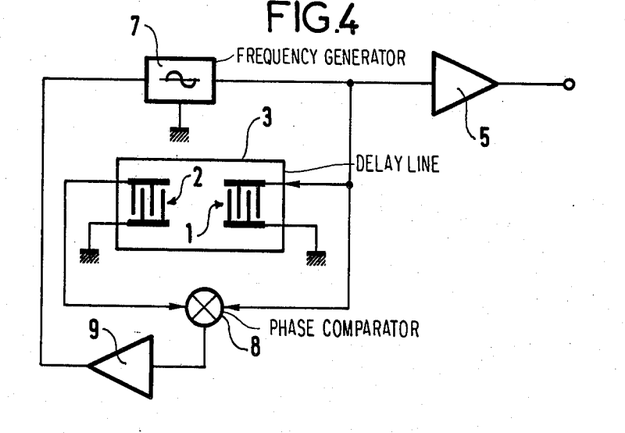
FIG. 4 schematically shows another frequency generator circuit using the first type of temperature probe in accordance with the invention.

FIG. 4 schematically represents another frequency generator circuit in which the delay line 3 is used in a phase locking loop of a frequency generator 7, which may equally well be a synthesiser or a voltage controlled oscillator (VCO). The output of the frequency synthesiser is connected to an output amplifier 5, to the transducer 1 of the delay line and to one input to a phase comparator 8 whose other input is connected to the other transducer 2 of the delay line. The output of the phase comparator 8 is connected via an amplifier 9 to a control input of the frequency generator 7. The phase comparator delivers a signal which is a function of the phase shift between the signal at the output of the frequency generator 7, and the same signal after the delay imposed by the delay line 3. The delay imposed by the delay line is itself a function of temperature. Thus temperature differences have the effect both of changing the distance between the transducers (surface wave propagation path), and of changing the speed of propagation because of the changes that occur in the moduli of elasticity of the quartz. This results in variation in the travel time between the input and output transducers of the delay line, and hence in the synchronous frequency of the delay line. For an LTS plate, this variation is substantially linear with varying temperature.

Figure 5:
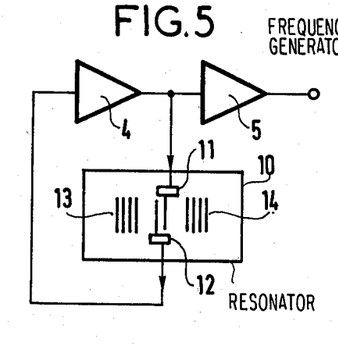
FIG. 5 shows an alternative embodiment of the circuit of FIG. 3 using a second type of temperature probe in accordance with the invention.

FIG. 5 represents an alternative embodiment of the circuit of FIG. 3 in which the temperature probe is a resonator.

This figure is identical to FIG. 3, except that the delay line is replaced by a resonator 10 comprising two interdigitated combs 11 & 12 and two reflectors 13 & 14. The combs 11 & 12 are shown diagrammatically. The input of the amplifier 4 is connected to the comb 12 and the output of the amplifier 4 is connected both to the comb 11 and to the output amplifier 5.

Figure 6:
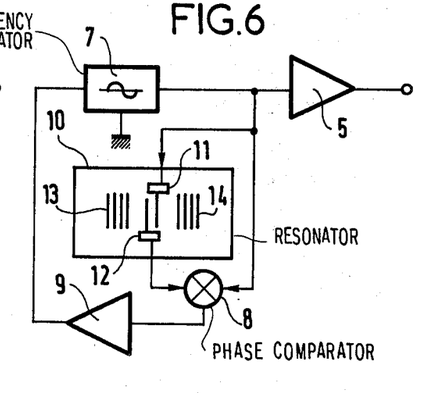
FIG. 6 shows an alternative embodiment of the circuit of FIG. 4 using the second type of temperature probe in accordance with the invention.

FIG. 6 represents an alternative embodiment of the circuit of FIG. 4, in which the temperature probe is a resonator 10 used in a phase locking loop of a frequency generator 7, which may equally well be a synthesiser or a voltage controlled oscillator (VCO). The output of the frequency synthesiser is connected to an output amplifier 5, to the comb 11 of the resonator 10 and to one input to a phase comparator 8 whose other input is connected to the other comb 12 of the resonator 10. The output of the phase comparator 8 is connected via an amplifier 9 to a control input of the frequency generator 7.

Figure 7:
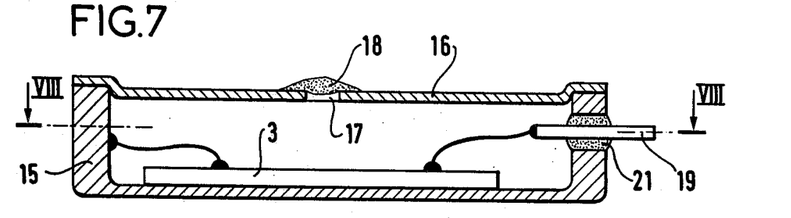
FIGS. 7 and 8 show a temperature probe in accordance with the invention in which the quartz plate is mounted in a housing in accordance with a first embodiment.
Figure 8:
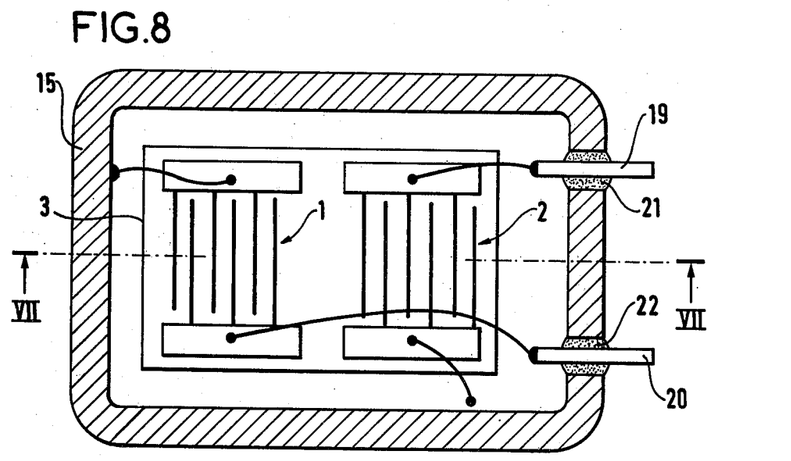

FIGS. 7 & 8 show a first mode of encapsulating the quartz plate of a temperature probe in accordance with the invention. FIG. 7 is an elevation through a section VII—VII in FIG. 8, while FIG. 8 is a plan through a section VIII—VIII in FIG. 7.

The quartz plate 3 of a delay line is glued on one face to the bottom of a metal box 15, while the opposite face of the plate carries the transducers 1 & 2. The box is closed by a lid 16 which is also made of metal and which is welded or soldered to the box. The lid has a hole 17 for use in evacuating the interior of the box after it has been closed, and for subsequently filling it with an inert gas such as helium. The hole 17 is then closed, e.g. by a blob of solder 18. Two metal terminals 19 & 20 are electrically insulated from the box by respective glass lead-throughs 21 & 22. The terminal 19 is connected to one comb of the transducer 2 whose other comb is connected to the box. Likewise, the terminal 20 is connected to one comb of the transducer 1 whose other comb is connected to the box.

Figure 9:
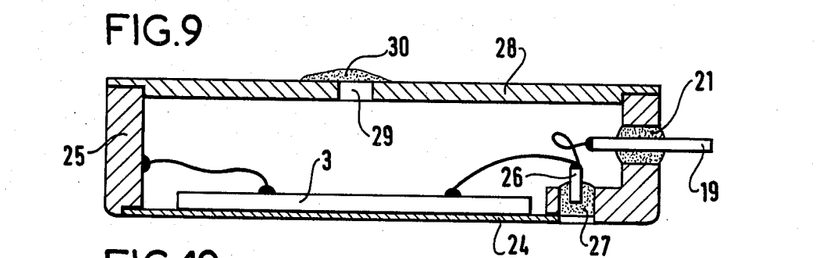
FIG. 9 shows a temperature probe in accordance with the invention in which the quartz plate is mounted in a housing in accordance with a second embodiment.

FIG. 9 is an elevation in section of a second mode of encapsulating the quartz plate of a temperature probe.

In this figure the metal box 25 is provided with a metal "window" 24 made of very thin copper or nickel foil, for example, having a thickness of about 0.05 mm, and to which the quartz plate is bonded. The box includes two terminals insulated therefrom as in FIGS. 7 & 8, even though only one of them is visible in FIG. 9.

The box further includes two auxiliary terminals, only one of which, terminal 26, is visible in FIG. 9. Each of the auxiliary terminals is connected both to one of the combs of a corresponding one of the transducers and to a corresponding one of the main terminals by a length of stainless steel, thereby providing thermal isolation between the main terminals and the quartz plate. The auxiliary terminals are insulated from the box by respective beads of glass 27, and they are not in direct communication with the outside of the box. As in the example of FIGS. 7 & 8, one comb of each of the transducers is connected to the box, and the box is evacuated and filled with a gas such as helium via a hole 29 in the lid 28. The hole is sealed with a drop of solder 30.

Figure 10:
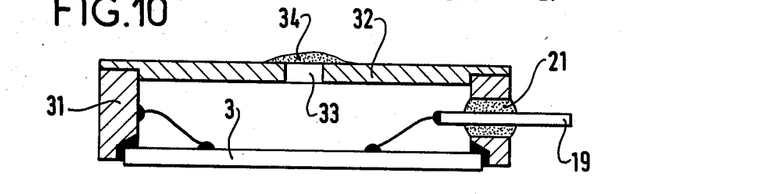
FIG. 10 shows a temperature probe in accordance with the invention in which the quartz plate is mounted in a housing in accordance with a third embodiment.

FIG. 10 is an elevation in section through a third mode of encapsulating the quartz plate of a temperature probe.

In this figure the quartz plate constitutes the bottom of the box 31, to which it is bonded round its edges. As in FIG. 7, the box has two terminals (only one of them, 19, being visible) connected to one comb each of respective transducers whose other combs are connected to the box. The box is closed by a lid 32 having a hole 33 that is sealed with a drop of solder 34.

In FIGS. 7 to 10, the description has been in terms of a delay line embodiment. Naturally, it is possible to use the same system for resonator embodiments, in which case the two terminals are connected to respective combs of the resonator's sole transducer, and there is no need to connect combs to the box.

Temperature probes in accordance with the invention have low thermal inertia since one face of the plate of quartz is either glued to a good conductor of heat, e.g. copper, (as illustrated in FIGS. 7 to 9), or else one face of the plate of quartz actually makes direct contact with the medium whose temperature is to be measured (FIG. 10). Since the time taken for heat to travel through the quartz is short, less than 1/10th of a second, the response time of the probe as a whole is also short, depending essentially on the thermal capacity of the box, and the smaller the box, the less its thermal capacity. The intimate contact between the plate of quartz and the box, makes it possible to obtain boxes which are considerably smaller that those required for bulk wave quartz plates. Another factor that leads to a small size of box, is that the higher the frequency used the smaller the dimensions of the quartz plate.

Now a temperature probe in accordance with the invention uses surface waves propagating over a quartz substrate, and this technology can be used at very high frequencies, up to about 3 GHz, which is not possible with temperature probes using waves propagating through the bulk of the substrate.

Given the resolution limits of frequency measuring apparatus, the higher the frequency, the more accurately temperatures can be measured in the vicinity of a given temperature.

Figure 11:
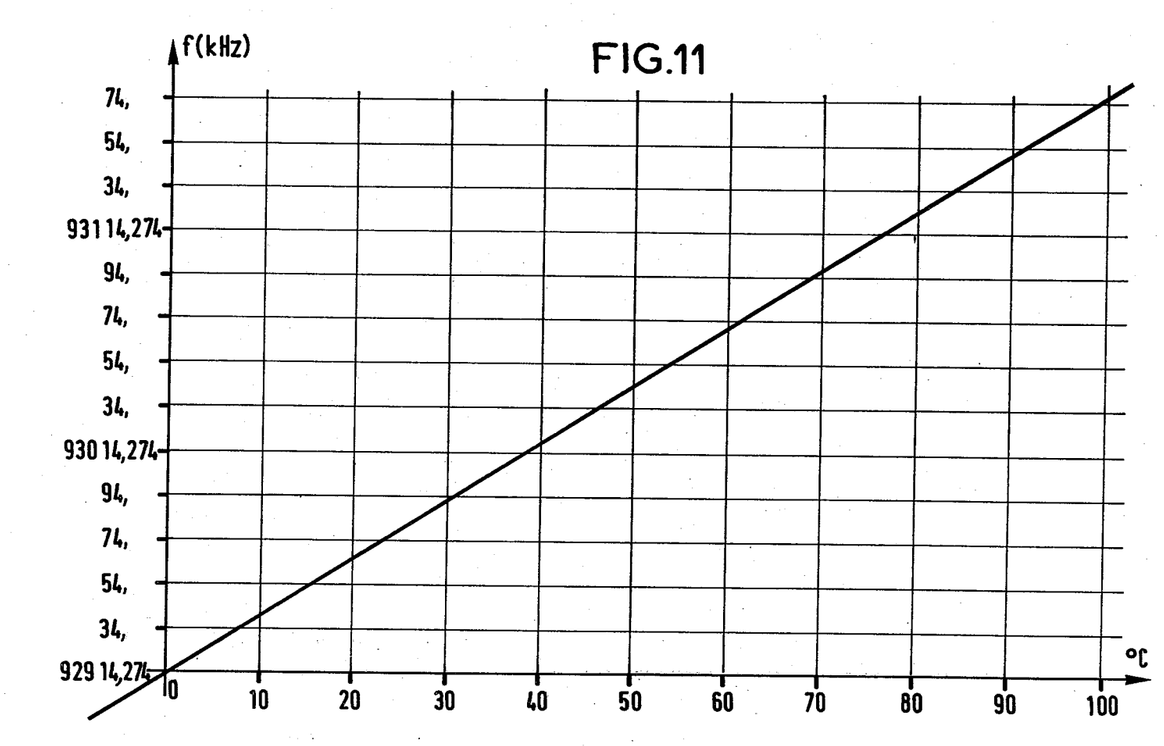
FIG. 11 is a frequency-temperature graph for a temperature probe.

FIG. 11 shows, by way of example, a graph of the frequency-temperature response of a temperature probe operating at a frequency of about 93 MHz.

The temperature range shown is from 0° to 100° C. with the frequency varying from 92.914 274 MHz at 0° to 93.174 274 MHz at 100°. This gives a sensitivity of 2600 Hz/°C., or about $26 \times 10^{-6}$/°C. The greatest measured non linearity in the range 0° C. to 80° C. is about 0.1° C.

The temperature probes described and shown are useful both for high performance thermometers for rapid temperature measurements, and for temperature sensing devices in high quality thermostats.

Both analog and digital thermometers can be provided. For thermostats, the probe can be used as a digital sensor for incorporation in a microprocessor controlled thermostat system, having a local accuracy to within a few micro degrees centigrade. Alternatively, a phase locking analog thermostat can be arranged to give local accuracy to within about one micro degree centigrade.

What is claimed is:

1. A temperature probe comprising a surface acoustic wave propagation device used in a frequency generator device, said surface acoustic wave propagation device having a characteristic frequency which varies in accordance with the temperature and being composed of a doubly rotated quartz cutting plate defined by:

$$yxwl: 9°24' \text{ to } 13°24'/57°24' \text{ to } 61°24'$$

the surface wave being propagated on a large surface of the plate in accordance with a direction making an angle of between 33° and 37° with the axis of second rotation.

2. The temperature probe of claim 1, wherein the quartz cutting plate is defined by:

$$yxwl: 11°24'/59°24'$$

and the surface wave is propagated in accordance with a direction making an angle of 35° with the axis of second rotation.

* * * * *